Patented Feb. 18, 1947

2,416,182

UNITED STATES PATENT OFFICE 2,416,182

RESIN BONDED ABRASIVE ARTICLES AND METHOD OF MAKING THE SAME

Samuel S. Kistler, West Boylston, Mass., assignor to Norton Company, Worcester, Mass., a corporation of Massachusetts No Drawing. Application April 6, 1945, Serial No. 587,016

7 Claims. (Cl. 51—298)

This invention relates to abrasive articles and more particularly to articles made of abrasive grains bonded by synthetic resins and rubbers.

Various types of grinding wheel have been made heretofore by bonding abrasive grains with a phenol formaldehyde condensation product; and other resins, such as aniline formaldehyde, melamine formaldehyde, and urea formaldehyde, are available for like purposes. These various resins have many desirable bonding properties, such as heat resistance, but in some abrasive structures the bonds made therefrom may not be wholly satisfactory, due to brittleness, insufficient strength or other characteristic. I have found that polyvinyl butyral has the property of imparting toughness and strength to such resin bonds in the production of abrasive articles.

One object of my invention is to combine polyvinyl butyral with one or more of various heat resistant resins and produce a satisfactory bonding material which may be readily handled and manipulated and easily incorporated with abrasive grains for producing the desired bonded article.

Polyvinyl alcohol condenses with butyraldehyde in the presence of an acid catalyst to give an acetal which is fusible and soluble. The properties of the polyvinyl butyraldehyde acetal vary somewhat, depending, for example, on whether there is a complete or a partial removal of acetate groups when the polyvinyl alcohol is made by hydrolyzing polyvinyl acetate, and depending on the molecular weight of the polyvinyl acetal or the amount of butyraldehyde condensed with the alcohol; but the different resins thus produced will serve my purposes. The condensation product of polyvinyl alcohol and butyraldehyde may be expressed as follows:

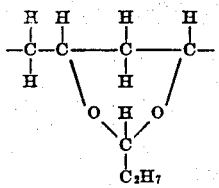

This polyvinyl butyral resin is a rubber-like material having a specific gravity of 1.11 and a tensile strength of over 8,000 pounds per square inch. The unplasticized resin has a heat distortion point of 130 to 140° C. and it is soluble in the lower alcohols and esters. It absorbs water slightly after a prolonged immersion. It may be plasticized by various materials, such as alkyl phthalates and triethylene glycol hexoate. It is commercially available in the form of a sheet which has the general appearance of natural rubber.

Polyvinyl butyral may be combined with a phenol formaldehyde condensation product, aniline formaldehyde, melamine formaldehyde, or urea formaldehyde in their reactive stages for the purpose of making an abrasive bond. These various resins are available as powders in an uncompleted or reactive stage of polymerization, and any one or a mixture of these powders may be milled directly into a sheet of the polyvinyl butyral by passing the sheet repeatedly between rotating milling rolls and incorporating the resin in the sheet by the rolling operation. Abrasive grains may be similarly incorporated in the rubbery mass. Thereafter, the mass may be shaped by die cutting it, and the article is cured or heat hardened to form the desired product. This milling procedure requires that the mill rolls be heated in order to soften the butyral sufficiently for the operation. But under these conditions, the reactive resin powders tend to polymerize to their final heat hardened condition; and this requires that the abrasive grains be incorporated quickly in the mixture and that the final article be molded into the required shape before the resins have polymerized sufficiently to set the mass.

Furfural may be used as a plasticizer to aid in the incorporation of the resin powder in the polyvinyl butyral sheet, such as by milling the furfural into the acetal or by dissolving the resin in the furfural. But furfural reacts with the resins, and too fast to permit any delays in the milling and molding operations since the mass tends to harden in a comparatively short time, and this makes it necessary to mix the bond ingredients just prior to the steps of adding the abrasive and molding the wheel.

A further object of this invention is to overcome such problems and to provide a procedure whereby the resin and the abrasive grains may be satisfactorily intermixed with the polyvinyl butyral, and ample time is provided for the mixing and molding operations before polymerization of the resin has set the material to a hard mass.

A further object is to provide an abrasive article containing a bond of polyvinyl butyral and a resin which have been compounded with the aid of a plasticizer capable of softening the mass for intermixing the various ingredients, and yet which will react with a resin ingredient and thus cease to exist as a plasticizer after the curing operation and so will aid in hardening or strengthening the final product. Further objects will be apparent in the following disclosure.

In accordance with my invention, I propose to combine or intermix polyvinyl butyraldehyde acetal with a reactive or polymerizable resin having a primary or secondary amine group, such as aniline formaldehyde, melamine formaldehyde, urea formaldehyde, and a phenol formaldehyde resin which contains an amine group, such as when the phenol formaldehyde has been reacted with hexamethylene tetramine or other amines or has been catalyzed with ammonia. The homologues of these resins as well as mixtures of any of the resins may be used. As a plasticizing fluid capable of wetting the abrasive grains and of aiding the compounding of the butyral and resin, I employ an alkylating and cross linking organic compound containing two or more of the active halogen atoms chlorine, bromine or iodine which will initially render the butyral resin mass plastic and then cross link with the resin chains at the amino groups under the conditions of curing and be eliminated as a fluid substance, and so aid through its reaction with the resin in hardening or strengthening the same.

The preferred alkylating and cross linking wettant plasticizers are the symmetrical polyglycol dichlorides and the glycol chlor acetates. Preferred examples of the former are dichlor ethylether:

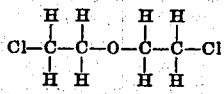

and triglycol dichloride:

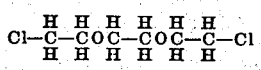

Of the glycol chloracetates, I may use the diesters of the glycols and monochlor-, dichlor- or trichlor-acetic acid, such as the diester of ethylene glycol and dichlor acetic acid:

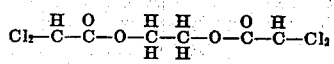

I may use the glycolmonochloracetates, such as the dimonochlor acetates of ethylene glycol:

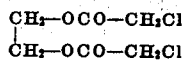

or of diethylene glycol:

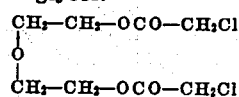

or of triethylene glycol:

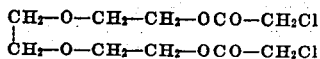

or of trimethylene glycol:

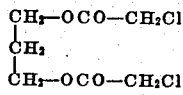

I may use the trimonochloracetates of a trihydric alcohol, such as glycerol tri-monochloracetate:

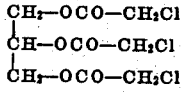

or tri-methylol propane tri-monochloracetate:

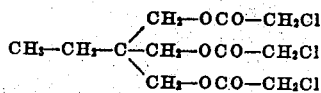

The various propylene or polypropylene glycol esters of the chloracetic acids will also serve. I may have bromine or iodine substituted for chlorine. Mixtures of these plasticizers may be used as the wettant plasticizer and cross linking agent. Also, furfural may be employed with the other ingredients in an amount small enough to prevent detrimental hardening during the milling stage. The furfural cross links with both the acetal and the resin.

Aniline formaldehyde condensation product may be represented by the formula:

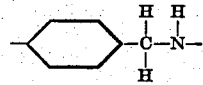

When it is cross linked with dichlor ethylether, for example, it is believed that the cross linking agent splits off halogen at the curing temperature and that this halogen transfers to the nitrogen atom, as shown by the following formula, which may be considered as a substituted ammonium chloride

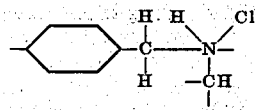

in which the nitrogen is attached to a phenylene and $CH_2$ group in the main resin chain and to a primary carbon atom in the cross linking chain, as well as to hydrogen and the transferred chlorine atom. This linkage structure is believed to be duplicated in the main resin chain at each end of the cross linking agent. The other plasticizing and cross linking reagents are believed to react similarly with the resin chain and form the substituted ammonium halide linkage, having the halogen transferred to the resin chain.

Hexamethylene tetramine $(CH_2)_6N_4$ is used to provide $CH_2$ groups and effect the final cure of the second stage reaction product of phenol and formaldehyde, where the latter was used in an insufficient amount to complete the condensation reaction. The hexamethylene tetramine powder is inter-dissolved by heat with the second stage solid but reactive phenol formaldehyde product, and the resultant combination in powdered form is incorporated with the butyral and the cross linking agent in my process. Then, during the final cure, the "hexa" reacts with the B stage resin to form a complex molecule and convert the resin into the final insoluble stage. At the same time, it furnishes nitrogen atoms for cross linking with the halogenating agent. Ammonia used as a catalyst reacts similarly.

The plasticizing agent serves its function as a plasticizer for incorporating the amine bearing resin in the polyvinyl butyral. It also wets the abrasive grains and aids in bringing the acetal resin bond into intimate contact during the milling operation. During the curing step, the halogenating and alkylating agent reacts with the resin and forms a harder and stronger body or gives it other desirable properties, such as making a grinding wheel freer cutting for use on stainless steel. The plasticizing agents do not react with the butyral, but they cross link only with the amine bearing groups of the resin incorporated therewith. At the milling or room temperatures, the plasticizer does not react with the amine bearing resin to any material extent, or it reacts so slowly that the resin and butyral ingredients may be suitably milled on a cold mill and the abrasive grains may be worked into the mass leisurely and the article may be molded at a much later time without detrimental polymerization taking place. This raw mixture of the acetal and the amine bearing resin, with or without the abrasive grains or other inert material, can be stored for long periods of time, and it will not cure or polymerize in the storage bin or until after it has been heated high enough to polymerize the mass.

An abrasive article, such as a grinding wheel, may be made of these various ingredients by first milling the plasticizing agent, such as triglycol dichloride, into the polyvinyl butyral, after which the amine bearing resin in its reactive or monomeric or partially polymerized state, and preferably in powder form, is added to the softened rubber as the latter is worked on a cold mill. If desired, the reactive resin powder may be dissolved in or wetted with the plasticizing agent, and a paste thus made may be spread on the polyvinyl butyral rubber sheet, after which the mass is passed repeatedly between the rolls of a milling machine. After the mass has been sufficiently worked to distribute the resin fairly uniformly throughout the butyral, then the granular abrasive material, with or without other ingredients, may be repeatedly sprinkled on this rubber-like resinous product and worked into the sheet to the desired extent and in accordance with standard milling procedure. Then the sheet containing the abrasive grains may be cut by means of a die to a desired grinding wheel or other abrasive shape. Thereafter the shaped article is subjected to a heating operation which serves to cure the resin and cause the required reactions to form a solid and strong bond having properties intermediate between an elastic rubber and a brittle body. This operation may comprise heating the shaped article in a mold which is steam heated to a temperature of about 150° C. for one hour. Or the mass may be cured outside of the mold in an oven heated for three hours at 150° C. This procedure applies to each one of the above-mentioned resins, although the temperatures and the times of the cure may be varied widely in accordance with standard knowledge, provided the heat condition is such as to cause the splitting off of the halogen and the cross linking at the amino groups.

The proportions of the ingredients may be varied widely, depending upon the grinding wheel characteristics desired. I may, for example, use 140 grams by weight of the amine bearing phenol formaldehyde resin group in its reactive powder form in a mass of 300 grams of polyvinyl butyral, together with 100 cc. of triglycol dichloride. Any desired proportions of abrasive grains may be incorporated therein, such as 80 parts of abrasive to 20 parts by weight of the combined resin ingredients. The butyral cross links with the phenol formaldehyde condensation product and this additional linkage aids the cross linkages between the plasticizer and the amine groups to form a stronger body.

As an example of the manufacture of a grinding wheel comprising a bond containing aniline formaldehyde resin, I may mill 295 grams of polyvinyl butyral with 100 cc. of triglycol-dichloride by using cold milling rolls. This makes a fairly stiff but rubbery mass. Thereafter I may incorporate in it 136 grams of reactive aniline formaldehyde resin; and a suitable amount of abrasive may be milled into that mixture. The products go together satisfactorily and form a tough mass in the cold condition, yet which is sufficiently soft to permit milling the abrasive grains therein. The material is tacky, although it does not stick to the rolls. The above proportions are such that substantially all of the triglycol-dichloride will react with the aniline formaldehyde. After the abrasive has been worked into the mass, it is hot pressed in a mold of required dimensions and thereafter subjected to the curing operation involving steam heating the mold at 115 lbs. pressure for 1 hr. and 25 minutes.

For a wheel made with melamine formaldehyde, I may employ 300 grams of the polyvinyl butyral with 65 cc. of triglycoldichloride and 90 grams of reactive melamine formaldehyde resin. A wheel comprising urea formaldehyde may be made by employing 300 grams of polyvinyl butyral with 75 cc. of triglycol-dichloride and 100 grams of reactive urea formaldehyde.

The proportions of the acetal, the resin and the plasticizer may be varied widely within the practical limits involved in not having the mass too dry or too fluid for handling or in making a bond too hard or too soft. However, the resin and the butyral ingredients are to be combined in substantial amounts whereby from 5 to 95% by weight of the combined bond ingredients is the polyvinyl butyral or the amine bearing resin. The amount of plasticizer may be likewise varied widely, but ordinarily I prefer that the plasticizer constitute from 5 to 25% by weight of the amount of resin used. The amount of plasticizer should be below that maximum which will react substantially completely with the bond ingredients, so that its plastic properties may be eliminated during curing. The other plasticizing agents may be employed similarly and in the same or other desired proportions with the butyraldehyde acetal and the amine bearing resin.

The plasticizer selected for each of the resins is to be capable of splitting off halogen and of interlinking with the resin at the temperature of the cure, so that it will aid initially in the incorporation of the amine bearing resin and the abrasive grains into the butyral sheet and then its plasticizing properties will disappear when the polyhalogen compound cross links with the adjacent amino groups of separate resin chains with a transfer of the halogen to the nitrogen. This cross linking changes a linear chain type of resin into a three dimensional cross linked chain structure which is less mobile and is stronger and more heat resistant and has other desirable characteristics of a cross linked body. The properties of the final product will therefore differ widely from those of articles having either the butyral or the resin as its bond.

It will also be understood that the abrasive may be a standard or desired abrasive material, such as crystalline alumina, silicon carbide, diamond or other natural or synthetic material. The grit sizes and pore structure are selected as desired and many standard procedures employed in the resins and rubber industry may be used in the production of these abrasive articles. Hence, the above disclosure is to be interpreted as explaining the principles of my invention and preferred compositions and methods involving the same and not as imposing limitations on the appended claims.

I claim:

1. The method of making a bonded abrasive article comprising the steps of intermixing polyvinyl butyral with at least one polymerizable amine bearing resin compound selected from the group consisting of aniline formaldehyde, melamine formaldehyde, urea formaldehyde and a phenol formaldehyde condensation product containing an amine group, incorporating abrasive grains therein with the aid of at least one alkylating plasticizing compound selected from the group consisting of the symmetrical polyglycol dihalides, the glycol halogen acetates and the homologues thereof, in which the halogen is selected from the group consisting of chlorine, bromine and iodine, shaping an article from the mixture and thereafter heating the article to polymerize and interreact ingredients of the mass and form a cured, bonded abrasive body.

2. The method according to claim 1 in which the polymerizable amine bearing resin in a reactive powder form and the abrasive grains are progressively milled on a non-heated mill into the polyvinyl butyral with the aid of the plasticizing compound, and the milled mass, after being shaped to a desired form, is heat cured to cross link the resin chains at the amino groups with the plasticizing compound.

3. An abrasive article comprising abrasive grains bonded by a heat cured substance comprising substantial amounts of polyvinyl butyral and at least one amine bearing resin selected from the group consisting of aniline formaldehyde, melamine formaldehyde, urea formaldehyde and a phenol formaldehyde resin containing an amine group, in which the amine bearing resin is reacted with a substantial amount of at least one compound selected from the group consisting of the symmetrical polyglycol dihalides, the glycol halogen acetates and the homologues thereof, in which the halogen is selected from the group consisting of chlorine, bromine and iodine.

4. An abrasive article according to claim 3 in which the polyvinyl butyral constitutes at least 5% by weight of the bond and the amount of the polyhalogen compound is from 5 to 25% by weight of the amine bearing resin.

5. An abrasive article according to claim 3 in which the alkylating compound is symmetrical polyglycol-dichloride.

6. An abrasive article according to claim 3 in which the alkylating compound is glycol chloracetate.

7. An abrasive article having abrasive grains bonded by a heat cured mass of polyvinyl butyral containing aniline formaldehyde reacted with a compound selected from the group consisting of the symmetrical polyglycol dihalides, the glycol halogen acetates and the homologues thereof, in which the halogen is selected from the group consisting of chlorine, bromine and iodine.

SAMUEL S. KISTLER.